United States Patent [19]

Schotz et al.

[11] Patent Number: 5,673,323
[45] Date of Patent: Sep. 30, 1997

[54] ANALOG SPREAD SPECTRUM WIRELESS SPEAKER SYSTEM

[75] Inventors: Larry Schotz, Mequon; William R. Steinike, Grafton; Mark R. Wolski, Glendale, all of Wis.

[73] Assignee: L. S. Research, Inc., Cedarburg, Wis.

[21] Appl. No.: 421,347

[22] Filed: Apr. 12, 1995

[51] Int. Cl.$^6$ ..................................... H04H 5/00
[52] U.S. Cl. ........................... 381/2; 381/14; 375/200
[58] Field of Search ........................... 381/1, 14, 2, 24, 381/6, 7, 17; 455/66, 314, 315, 209; 375/363, 208, 200

[56] References Cited

U.S. PATENT DOCUMENTS

| | | |
|---|---|---|
| 3,256,389 | 6/1966 | Ehrich . |
| 3,471,646 | 10/1969 | Magnuski et al. . |
| 3,684,965 | 8/1972 | Gautney et al. . |
| 3,757,220 | 9/1973 | Abel . |
| 3,787,772 | 1/1974 | Sedin . |
| 4,079,203 | 3/1978 | Dragoo . |
| 4,501,019 | 2/1985 | Matsukura et al. . |
| 4,586,081 | 4/1986 | St. Arnaud et al. . |
| 4,621,374 | 11/1986 | Micic et al. . |
| 4,654,859 | 3/1987 | Kung et al. . |
| 4,704,715 | 11/1987 | Shibagaki et al. . |
| 4,710,970 | 12/1987 | Wu et al. . |
| 4,829,570 | 5/1989 | Schotz . |
| 4,864,636 | 9/1989 | Brunius . |
| 4,922,483 | 5/1990 | Kobayashi . |
| 4,932,072 | 6/1990 | Toko . |
| 4,951,006 | 8/1990 | Cohen . |
| 5,012,350 | 4/1991 | Streck et al. . |
| 5,046,132 | 9/1991 | Trefney . |
| 5,077,835 | 12/1991 | Margairaz et al. . |
| 5,106,826 | 4/1992 | Alford et al. . |
| 5,152,003 | 9/1992 | Poch . |
| 5,155,590 | 10/1992 | Beyers, II et al. . |
| 5,216,378 | 6/1993 | Einbinder et al. . |
| 5,299,264 | 3/1994 | Schotz et al. . |
| 5,361,381 | 11/1994 | Short ........................... 361/24 |

FOREIGN PATENT DOCUMENTS

| | | | |
|---|---|---|---|
| 4418337 | 11/1995 | Germany . | |
| 2276794 | 5/1994 | United Kingdom ............ H04J 13/00 |
| WO 94 28639 | 12/1994 | WIPO . | |

OTHER PUBLICATIONS

Principles of Digital Audio 1989, ISBN 0-672-22634-0 pp. 185-228, XP112017123 Ken C. Pohlmann: "Chapter 8" see pp. 210-228.

Brian C. Fenton Radio Electronics Editorial—Some Happenings at the FCC Jan. 1998.

Spec-Com—The Radio Amateur's Journal for Specialized Communications-Sept/Oct. 1985.

Resomics Murata Products For Mobile Telecommunications E-AMPS.

Kuchler Coaxial Ceramic Resonators for UHF and Microwaves—1989.

Gravina E-Z Comm Wave—Voltage Controlled Oscillators from 20 MHz to 310.

RF Micro Devices Low Noice Amplifier/Mixer.

RF Micro Devices 2.5 GHz Direct Quadrature Modulator.

Motorola Serial Input PLL Frequency Synthesizer 1993.

(List continued on next page.)

*Primary Examiner*—Curtis Kuntz
*Assistant Examiner*—Minsun Oh
*Attorney, Agent, or Firm*—Caesar, Rivise, Bernstein, Cohen, & Pokotilow, Ltd.

[57] ABSTRACT

An analog spread spectrum wireless speaker system for use in consumer audio applications for providing reliable and high fidelity stereo sound. The system includes a transmitter that accommodates any analog input from a variety of audio devices such as compact disk players, cassette players, AM/FM tuners and transmits this information in the 2.4–2.4835 GHz band to a receiver at a remote location. The receiver is capable of reproducing the audio signal with good frequency and signal-to-noise performance.

1 Claim, 5 Drawing Sheets

OTHER PUBLICATIONS

Atmel AT48802 Spread–Spectrum Signal Processor Integrated Circuit.

Hewlett–Packard Silicon Bipolar MMIC 5 GHz Active Double Mixer/IF Amp.

Sumida Electric Co., Ltd. TA8122AN/AF–TA8123AF AM/FM 1Chip Tuner IC's.

Sawtek, Inc. 70/140 MHz Bandpass Filters.

Hewlett–Packard 1.5–8 GHz Low Noise GaAs MMIC Amplifer.

Microchip Technology, Inc. ROM–Based 8–Bit CMOS Micro–controller–PIC16CR57A 1994.

Teledyne Electronic Technologies TAE–1020–2.4GHz GaAs MMIC ISM Band Power Amplifier.

Gravina Voltage Controlled Oscillators.

Z–Communications Voltage Controlled Inc. Oscillators SMV2500.

RCA CMOS Ripple–Carry Binary Counter/Dividers.

CMOS Analog Multiplexers/Demultiplexers.

NEC NPN Silicon High Frequency Transistor–NE856 Series.

ANALOG SPREAD SPECTRUM WIRELESS SPEAKER SYSTEM

FIELD OF THE INVENTION

The invention relates generally to the transmission and reception of information such as analog audio data over the air. More particularly, the invention pertains to the transmission/reception of high fidelity audio signals over the air over short distances using high frequency carriers at low power.

BACKGROUND OF INVENTION

A number of systems have been developed to avoid wiring stereo speakers directly to the source of signals used to drive the speakers, e.g., phonographs, tape decks, CD players, or AM/FM tuners. By way of example, U.S. Pat. No. 4,829,570, issued to Larry Schotz on May 9, 1991, discloses a system of this type. This system, while not requiring direct wiring between the source of signals and the speaker, transmits the signals over the A.C. electrical conductors of the building in which the system is located. The signals transmitted in this manner are subject to certain undesirable effects, such as filtering for computer systems. This type of filtering may eliminate or degrade the signals intended for transmission to the speakers.

An alternative to using any form of wiring between a speaker and the source of signals for driving the speaker is to transmit the signals over the air via electromagnetic waves such as radio waves. This type of system requires the use of a transmitter for transmitting the signals, a receiver for receiving the signals at the speaker, and a power amplifier for amplifying the signals at the speakers to properly drive the speakers. The drawback with this type of system is that the FCC strictly regulates the frequencies at which information may be transmitted over the air without the requirement of an appropriate license. Additionally, the number of frequencies at which transmission may occur is limited. Currently, the frequency bands available for transmitting information using low power transmission without a license are at high frequency ranges. For example, the FCC currently allows the use of low power transmission (i.e., below 1 milliwatt for conventional modulation or below 1 watt for spread spectrum modulation, 47 CFR §15.249) in the range of 902 to 928 MHz, 2.4 to 2.483 GHz and 5.725 to 5.875 GHz. One such wireless speaker system is disclosed in U.S. Pat. No. 5,299,264 (Schotz et al.) issued on Mar. 29, 1994 and which is also assigned to the same assignee, namely L. S. Research, Inc., as the present invention. Another wireless speaker system is disclosed in U.S. application Ser. No. 08/070,149, assigned to the same assignee as the present invention and whose disclosure is incorporated by reference herein. In particular, the 08/070,149 apparatus is an analog system for transmitting signals from a plurality of audio sources simultaneously over the air using carrier signals in the 902–928 MHz range.

Wireless speaker systems are desirable, since wiring is not required between the speakers and source of signals for driving the speakers; however, an arrangement of this type is not practical if the quality of the information signal driving the speaker is poor. Stereo speaker applications require high signal-to-noise ratios, good frequency response, low distortion, and stereo capability (simultaneous transmission of two channels of information) to be practical. A wireless speaker system is not a replacement for a system using wires unless the quality of information signals provided to drive the speakers results in a sound at the speakers comparable with the sound at similar speakers in a system using wires.

The transmission/reception of audio signals, e.g., music, (approximately 20 Hz to 20 kHz) must be distinguished from the transmission/reception of voice signals (approximately 300 Hz to 3 kHz). The former requires wideband transmission while the latter requires only narrowband transmission.

One implementation of a digital wireless speaker system operating in the 2.4 GHz band is disclosed in U.S. Application Ser. No. 08/344,298, assigned to the same assignee as this invention, namely L. S. Research, Inc., and whose disclosure is incorporated by reference herein.

Accordingly, the need exists for an analog system capable of transmitting and receiving audio over the air using high frequency carriers (e.g., 2.4 GHz) at low power while maintaining the quality of the audio.

OBJECTS OF THE INVENTION

Accordingly, it is the general object of this invention to provide an apparatus which overcomes the disadvantages of the prior art.

It is still a further object of this invention to enable the user to listen to high quality audio in any remote location without external wires or independent equipment.

It is even yet a further object of this system to provide the user with compact disc quality sound through a wireless system.

It is yet another object of this invention to provide a system that can directly transmit the analog audio output available from compact disc players, digital audio tape players, as well as other sources.

It is yet a further object of this invention to provide a system for providing high fidelity sound at low cost.

It is yet a further object of this invention to provide an analog spread spectrum wireless speaker system.

SUMMARY OF THE INVENTION

These and other objects of the instant invention are achieved by providing a high fidelity, wireless transmission, audio system for use with an audio source, the source providing a first electrical input signal and a second electrical input signal and wherein the audio system is arranged for wirelessly transmitting over the air an electrical signal representing the audio input signals. The audio system comprises a transmitter arranged to be coupled to an audio source and comprises multiplexing means for converting the first and second electrical input signals into a first composite electrical signal. The audio system further comprises carrier signal producing means for producing a carrier signal of a predetermined frequency of at least 2.4 GHz and a spread spectrum modulation means for modulating the carrier signal with the first composite electrical signal to produce a modulated carrier signal. The transmitter also comprises a first antenna means for emitting over the air said modulated carrier signal at a power level not exceeding approximately 1 watt. Finally, the audio system comprises a receiver located within a range of approximately 10 to 300 feet (3 to 90 meters) of the transmitter and is coupled to an audio transducing device whereby the receiver receives and demodulates the modulated carrier signal into a second composite signal.

DESCRIPTION OF THE DRAWINGS

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
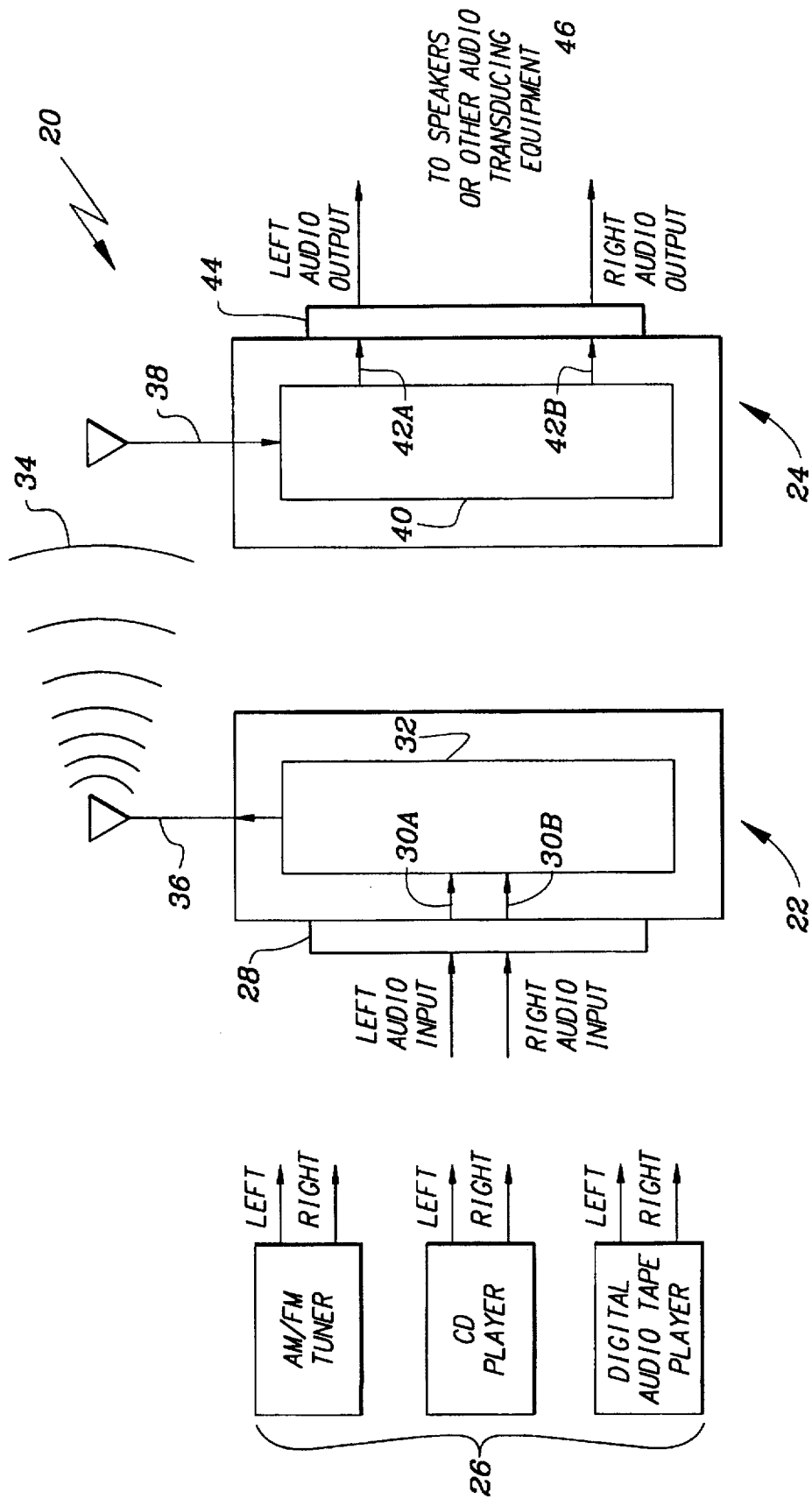
FIG. 1 is a diagram of the analog spread spectrum wireless transmission system.

Referring now in detail to the various figures of the drawing wherein like reference characters refer to like parts, there is shown at 20 in FIG. 1, the analog spread spectrum wireless speaker system.

The system 20 comprises a transmitter 22 and a receiver 24, each utilizing respective analog circuitry, similar to respective circuitry of the transmitter and receiver disclosed in application Ser. No. 08/070,149. One type of audio source equipment 26 (e.g., AM/FM tuner, compact disc player, digital audio tape player, etc.) is coupled to the transmitter 22 via coupling means 28. In particular, analog left and right audio channel signals are accommodated on input lines 30A and 30B. The analog circuitry 32 basically modulates a 2.4 GHz carrier frequency signal with the multiplexed analog left and right audio channel signals and prepares a broadcast signal 34 for transmission to the receiver 24. The broadcast signal 34 is transmitted from the transmitter antenna 36 and over the air to the receiver 24.

The receiver 24, located at a remote site (e.g., another room, floor level, etc., in the range of approximately 10 to 300 feet from the transmitter 22), receives the broadcast signal 34 via a receiver antenna 38. The receiver's circuitry 40 then demodulates the audio information from the broadcast signal 34 into respective output signals on lines 42A and 42B that are provided to a coupling means 44 for connection to speakers or other audio transducing equipment 46.

Figure 2:
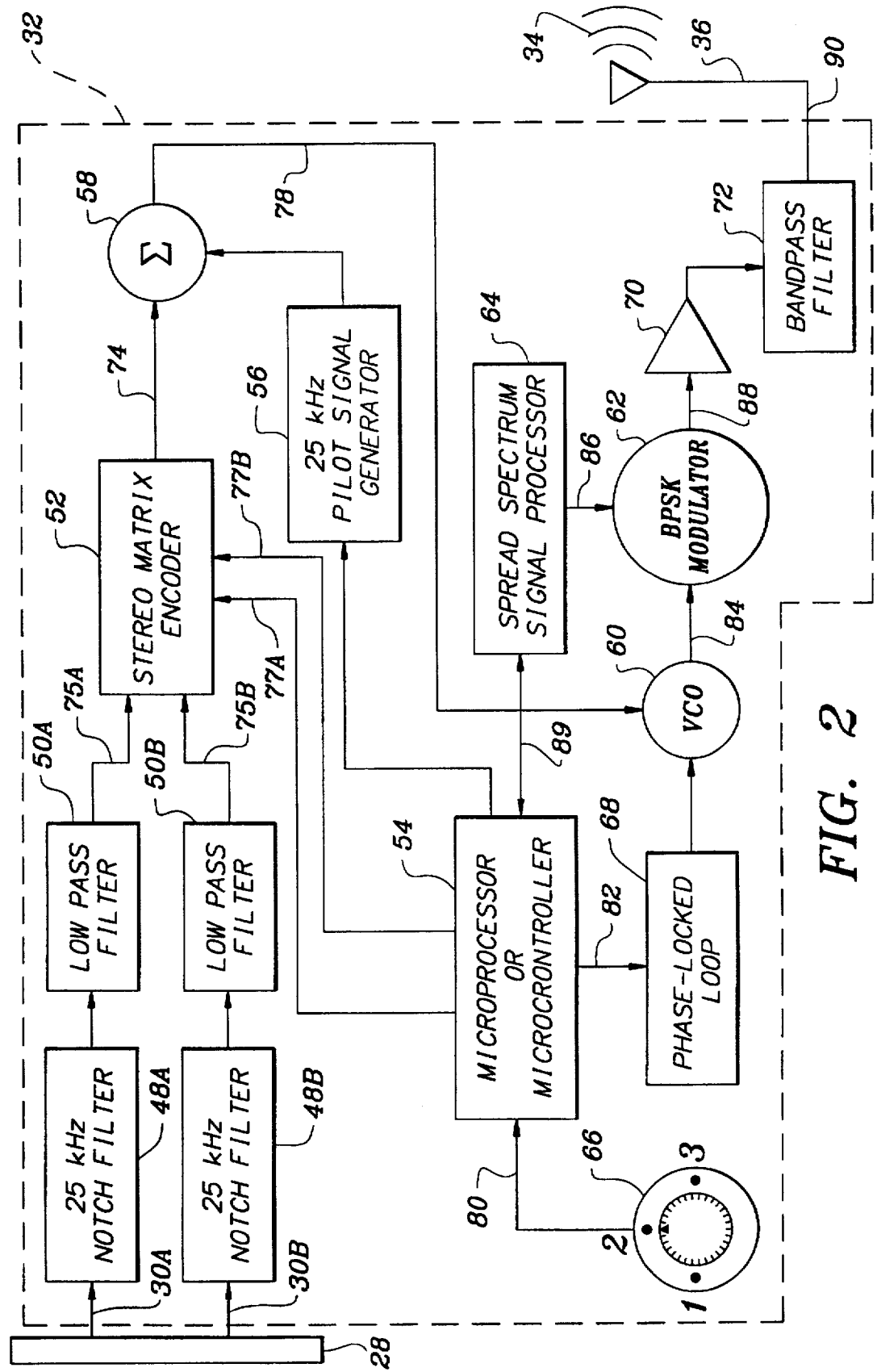
FIG. 2 is a block diagram of the transmitter of the analog spread spectrum wireless speaker system.

The details of the transmitter circuitry 32 will now be discussed. As shown in FIG. 2, the circuitry 32 comprises 25-kHz notch filters 48A and 48B, low-pass filters 50A and 50B, a stereo matrix encoder 52, a transmitter microprocessor (μP) 54 (or a microcontroller), a 25-kHz pilot signal generator 56, a summer 58 a voltage controlled oscillator (VCO) 60, a binary phase shift keying (BPSK) modulator 62, a spread spectrum signal processor 64 a house code select switch 66, a phase-locked loop 68, a power amplifier 70 and a bandpass filter 72.

At this juncture it should be noted that although the transmitter microprocessor 54 (e.g., ROM-based 8-bit CMOS Microcontroller PIC16CR57A) is used to control the phase-locked loop 68, the microprocessor 54 also controls the stereo matrix encoder 52 and the 25-kHz pilot signal generator 56, as will be discussed later. Although a separate, dedicated microprocessor could be used exclusively for each of these controlled components, the microprocessor 54 is capable of such multi-purpose use within the transmitter circuitry 32.

As shown in FIG. 2, the left and right stereo signals on leads 30A and 30B are both passed through 25-kHz notch filters 48A and 48B, respectively, and low-pass filters 50A and 50B, respectively, before stereo multiplexing. Each notch filter 48A and 48B comprise a notch component that notches out any 25 kHz and 50 kHz signals while each filter 50A and 50B comprises a low pass component that filters any signals higher than 20 kHz. This is done so that no interference is incurred in the stereo multiplexing in the stereo matrix encoder 52.

The filtered left and right audio signals on leads 75A and 75B, respectively, are then fed to the stereo matrix encoder 52 that derives the baseband L+R (Left+Right, 20 Hz-20 kHz) and the double side band suppressed carrier L-R (Left-Right, 30 kHz-70 kHz) signals and outputs these into a single signal on lead 74. The stereo matrix encoder 52 uses a chopper modulator to combine these two component signals on leads 75A and 75B into a single signal. In particular, the chopper modulator comprises a 4066 chip which is a quad bilateral switch that receives 50 kHz switching signals 77A and 77B generated by the microprocessor 54. This performs the chopping function resulting in the single signal comprising the L+R and L-R signals which is then filtered by the stereo matrix encoder 52. This single filtered signal on lead 74 is then summed by the summer 58 with the pilot (25 kHz) to result in the multiplexed stereo signal on lead 78. Thus, the stereo multiplexed signal comprises the baseband L+R signal (20 Hz—20 kHz), the double side band suppressed carrier L-R signal (30 kHz–70 kHz), and a pilot signal (25 kHz) which encompasses a full information bandwidth of 70 kHz.

It should be noted at this juncture that the microprocessor 54 generates a 25-kHz square wave that the pilot signal generator 56 converts into a 25 kHz sinusoidal pilot signal.

This multiplexed signal on lead 78 is fed to, and modulates, the voltage controlled oscillator 60 (VCO, e.g., ZCOMM, V800MC03) using frequency modulation (FM). The frequency of the VCO 60 is controlled by a phase-locked loop 68 (PLL e.g., Motorola MC12210) in conjunction with the house code select switch 66 and the microprocessor 54. The peak frequency deviation from the VCO 60 center frequency is set for optimal tuner performance of the receiver 24. This optimization in the receiver 24 is a tradeoff between Signal to Noise (S/N) ratio, receiver 24 Intermediate Frequency (IF) filter requirements, and bandwidth of the FM tuner.

It should be noted at this juncture that the VCO 60 produces any one of a number of carrier frequencies (e.g., 2.42 GHz, 2.44 GHz and 2.46 GHz). In particular, the user sets the house code select switch 66 (any variable position BCD switch that is located on the outside of the transmitter 22 unit) to a particular setting and this setting information is transmitted to the microprocessor 54 via data line 80. The microprocessor 54 then transmits the corresponding set of frequency data to the PLL 68 (e.g., Motorola MC12210 Serial Input PLL Frequency Synthesizer) on data line 82 which controls the VCO 60 (e.g., Z-Comm SMV2500 Voltage Controlled Oscillator) in generating the particular 2.4 GHz carrier frequency for the BPSK modulator 62. The microprocessor 54, house code select switch 66, PLL 68 and VCO 60 operate in accordance with a similar transmitter local oscillator circuitry as disclosed in U.S. Application Ser. No. 08/070,149. However, in the present application, spread spectrum modulation is used in conjunction with these components, as will be discussed below.

The carrier frequency for the system is in the 2.4–2.4835 GHz band for several reasons. First, interference in this band is significantly reduced relative to other bands. Second, the available bandwidth meets the transmission requirements. Lastly, at 2.4 GHz, the antenna size (i.e., transmitter antenna 36 and receiver antenna 38) is much smaller and less obtrusive to the user. Furthermore, it should also be pointed out that use of spread spectrum modulation techniques in the 2.4 GHz band are allotted up to 1 watt of transmitting power rather than only the 1 milliwatt of power allotted for non-spread spectrum modulation. 47 CFR §15.249.

The transmission frequencies of 2.42 GHz, 2.44 GHz and 2.46 GHz are exemplary only and are not meant to limit the present invention to those particular frequencies in the available 2.4 GHz band.

As shown in FIG. 2, the FM output of the VCO 60 on lead 84 is then fed to the BPSK modulator 62 (e.g., RF Micro Devices RF2422) where it is mixed with the pseudo-noise (PN) code on lead 86 from the spread spectrum signal processor 64. The process of introducing the PN code after the VCO 60, or RF spreading, allows analog modulation to be used. Typical systems mix the PN code with digitized data before modulating the VCO 60. The PN code is generated from a commercially available spread spectrum signal processor 64, such as the Atmel AT48802, thereby implementing a direct sequence (DS) spread spectrum. Using spread spectrum implies that the RF spectrum is much wider than the transmitted information and that some other function other than the information being sent is used to determine the resulting modulated RF bandwidth. By utilizing spread spectrum, the system has several inherent advantages such as longer range transmissions and interference rejection, thereby yielding higher audio performance. In addition, by using a different spreading function, different channels can be received in the same frequency band.

The microprocessor 54 loads all of the internal control registers of the spread spectrum signal processor 64 via interface lead 89. These registers control the PN codes and an internal correlator, as well as other supervisory functions, i.e., basically setting up all of the link conditions for the PN code and timing.

Finally, the modulator 62 output on lead 88 is amplified by the power amplifier 70 (e.g., Teledyne MMIC TAE-1020) and then passed through the bandpass filter 72 for removing undesired harmonics. The filtered signal is then fed into the transmitter antenna 36 from lead 90. The broadcast signal 34 is emitted at a power level that is in compliance with 47 CFR §15.249, the FCC requirement for wireless transmission in the 2.4-2.483 GHz frequency band using spread spectrum.

Figure 3:
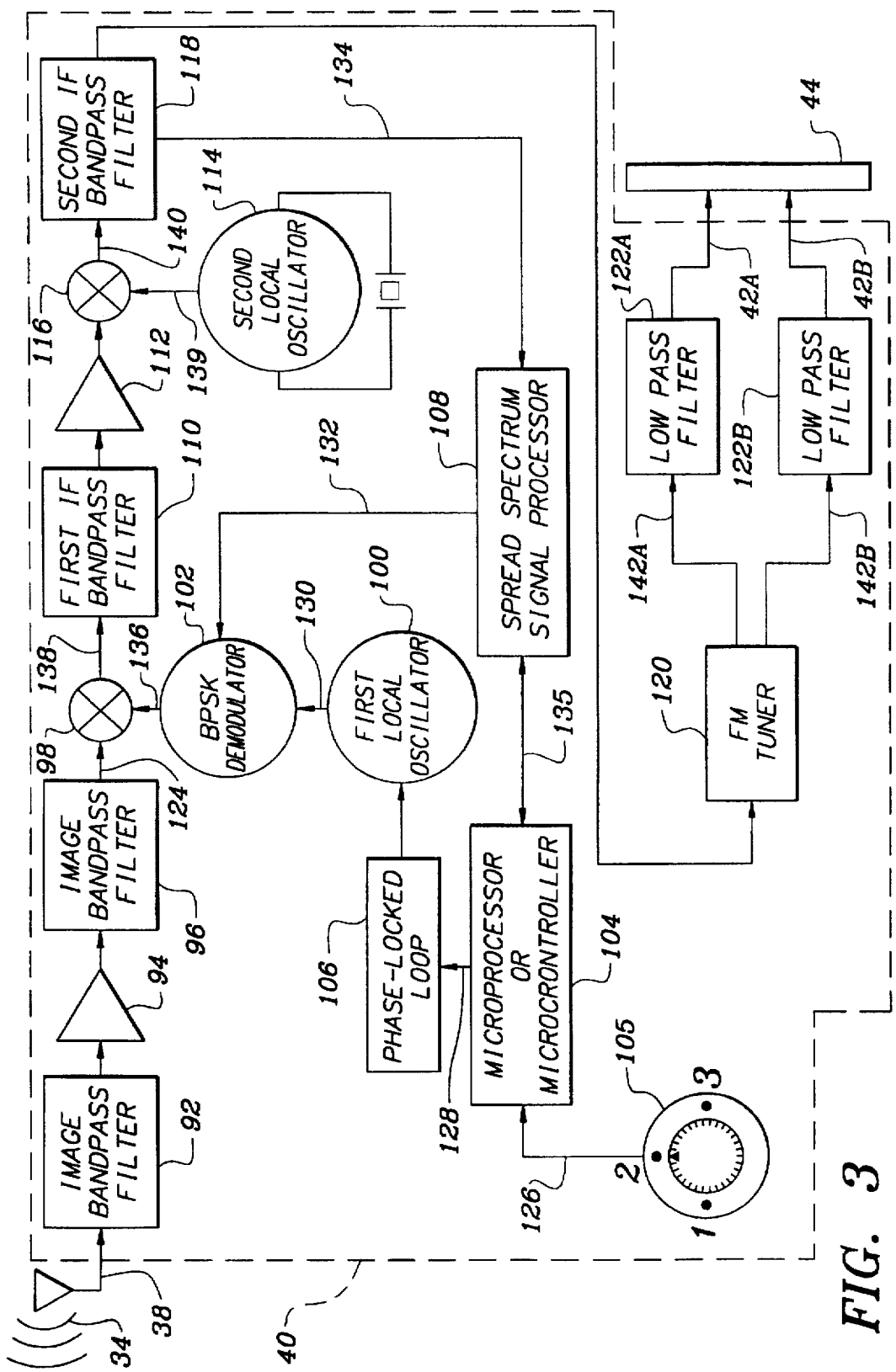
FIG. 3 is a block diagram of the receiver of the analog spread spectrum wireless speaker system.

The details of the receiver circuitry 40 will now be discussed. As shown in FIG. 3, the receiver analog circuitry 40 comprises a first image bandpass filter 92, a low-noise amplifier 94, a second image bandpass filter 96, a first down-converter mixer 98, a first local oscillator 100, a BPSK demodulator 102, a receiver microprocessor 104, a phase-locked loop 106 (PLL), a house code select switch 105, a spread spectrum signal processor 108, a first bandpass filter 110, a first intermediate frequency (IF) amplifier 112, a second local oscillator 114, a second down-converter mixer 116, a second IF bandpass filter 118, an FM tuner 120 and left lowpass filter 122A and a right lowpass filter 122B.

The incoming broadcast signal 34 is fed from the receiver antenna 38 to a first image bandpass filter 92, through a low noise amplifier 94 (e.g., Hewlett-Packard MGA-86576) and through a second image bandpass filter 96. The purpose of these image bandpass filters 92 and 96 is to attenuate incoming signals that are at the image frequency of the first local oscillator 100. The bandpass filters 92 and 96 can be implemented with a variety of conventional filter circuits or by commercial filters such as the Sawtek 851541 SAW filter. This filtered signal on lead 124 is fed into the first down-converter mixer 98.

The local oscillator VCO 100 (e.g., ZCOMM, V800MC03), the receiver microprocessor 104 (e.g., ROM-based 8-bit CMOS Microcontroller PIC16CR57A), the PLL 106 (e.g., Motorola MC12210 Serial Input PLL Frequency Synthesizer), and the house code select switch 105 operate in accordance with a similar receiver local oscillator circuit as disclosed in U.S. Application Ser. No. 08/070,149. In particular, the user sets the house code select switch 105 (any variable position BCD switch located on the outside of the receiver 24 unit) to the corresponding setting of the transmitter house code select switch 66 and this setting information is transmitted to the microprocessor 104 via data line 126. The microprocessor 104 then transmits the corresponding set of frequency data to the PLL 106 on data line 128 which controls the first local oscillator 100 in generating a first local oscillator signal in the 2.4 GHz band on lead 130.

The first local oscillator signal on lead 130 is fed to the BPSK demodulator 102 (e.g., an RF2422) where it is mixed with a PN code on lead 132. This PN code is generated by the spread spectrum signal processor 108 (e.g., Atmel AT48802 Spread Spectrum IC). The spread spectrum signal processor 108 receives a received-signal strength signal on lead 134 from the second IF bandpass filter 118 which is used by the spread spectrum signal processor 108 to determine the PN code timing. Hence, the correct PN code timing correlates to the strongest signal. Furthermore, much like the transmitter microprocessor 54, the receiver microprocessor 104 also loads all of the internal control registers of the spread spectrum signal processor 108 via interface lead 135 for the same reasons discussed earlier. In addition, the receiver microprocessor 104 controls the spread spectrum signal processor 108 synchronization and tracking relating to acquisition of the PN code.

The output signal from the BPSK demodulator 102 on lead 136 is mixed with the filtered signal on lead 124 in the first down-converter mixer 98 (e.g., Hewlett-Packard Mixer, IAM-82008) to perform the first down-conversion to the first IF, thereby creating a first IF signal on lead 138. At this juncture it should be noted that the introduction of the PN code before the first down-conversion, or RF de-spreading, results in a more narrow IF channel than is used in typical DS spread spectrum systems. This results in a higher level of interfering signal immunity and lower system noise. On the other hand, conventional DS spread spectrum systems that perform the de-spreading at baseband require a much wider IF bandwidth.

The first IF signal on lead 138 is fed through a first IF bandpass filter 110 and then into a second down-conversion comprising the first IF amplifier 112, the second local oscillator 114 and the second down-converter mixer 116. The first IF amplifier 112 and the second down-converter mixer 116 can be implemented using an RF2401 Low Noise Amplifier/Mixer. As shown in FIG. 3, the second local oscillator 114 comprises a 255 MHz oscillator circuit which generates a second local oscillator signal on lead 139 that is used to down-convert the first IF signal to a second IF signal (70 MHz) that can be demodulated by a conventional FM tuner. As shown in FIG. 3, the second IF signal on lead 140 is passed through the second IF bandpass filter 118 and fed into the FM tuner 120 (e.g., TA8122 FM Tuner). The FM tuner 120 performs the demodulation of the broadcast signal 34 into a composite signal which is then demultiplexed into the corresponding left and right channel stereo signals. In particular, the 70 MHz signal on lead 140 is fed to the FM tuner 120 where it is mixed on board the FM tuner 120 and the signal is down-converted to a 10.7 MHz IF. The FM tuner 120 then demodulates the stereo FM signal into a left channel and a right channel on leads 142A and 142B. These two channel signals are then de-emphasized and filtered by low pass filtering circuits 122A and 122B. Once filtered these two channels are provided on output left channel lead 42A and right channel output lead 42B to the receiver coupling means 44.

Both the transmitter 22 and the receiver 24 have respective power circuits (not shown) that convert input power (e.g., 120 VAC at 60 Hz) into proper voltage levels for appropriate transmitter and receiver operation.

Figure 4:
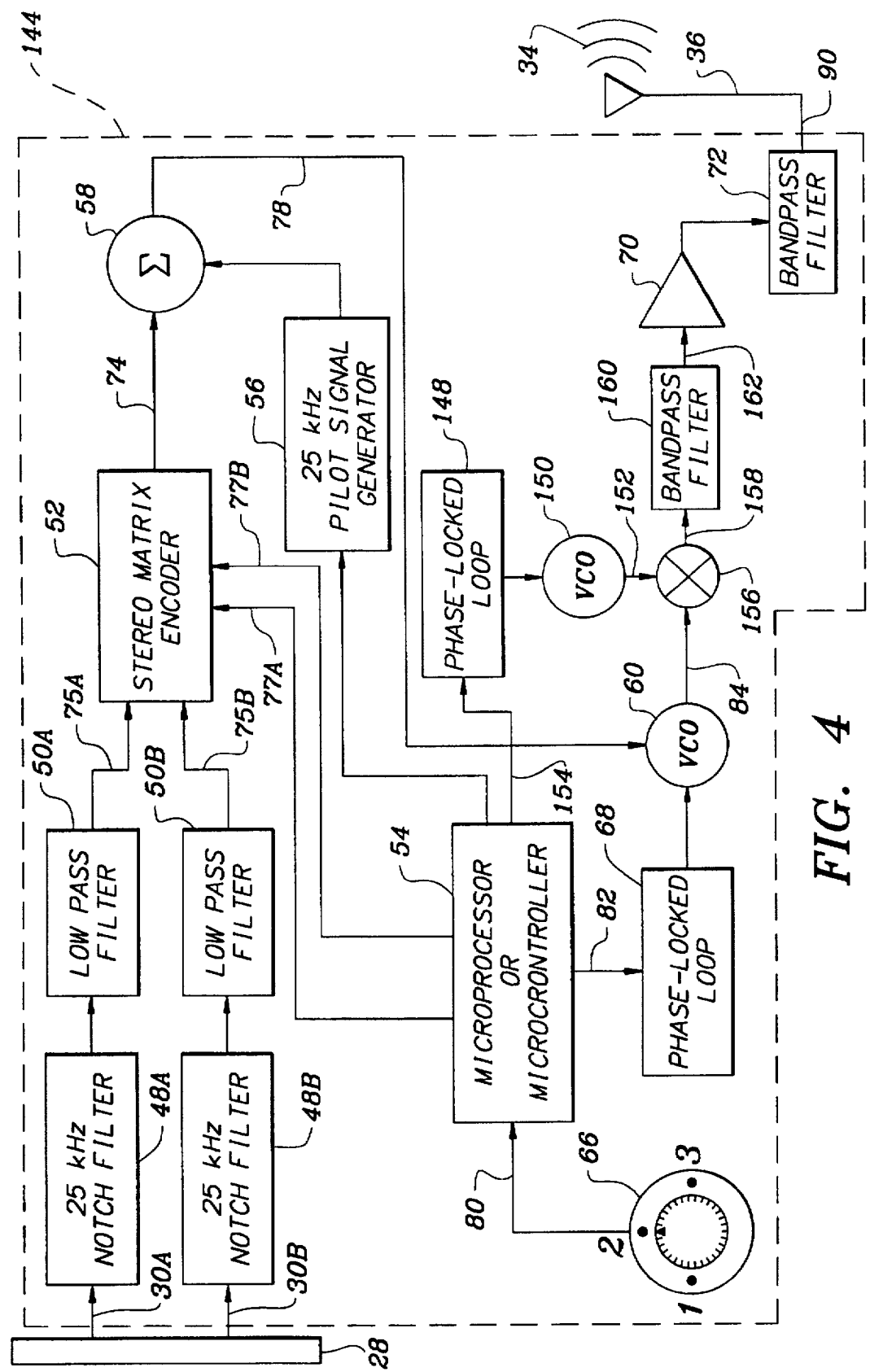
FIG. 4 is a block diagram of the transmitter of the analog spread spectrum wireless speaker system using frequency hopping.
Figure 5:
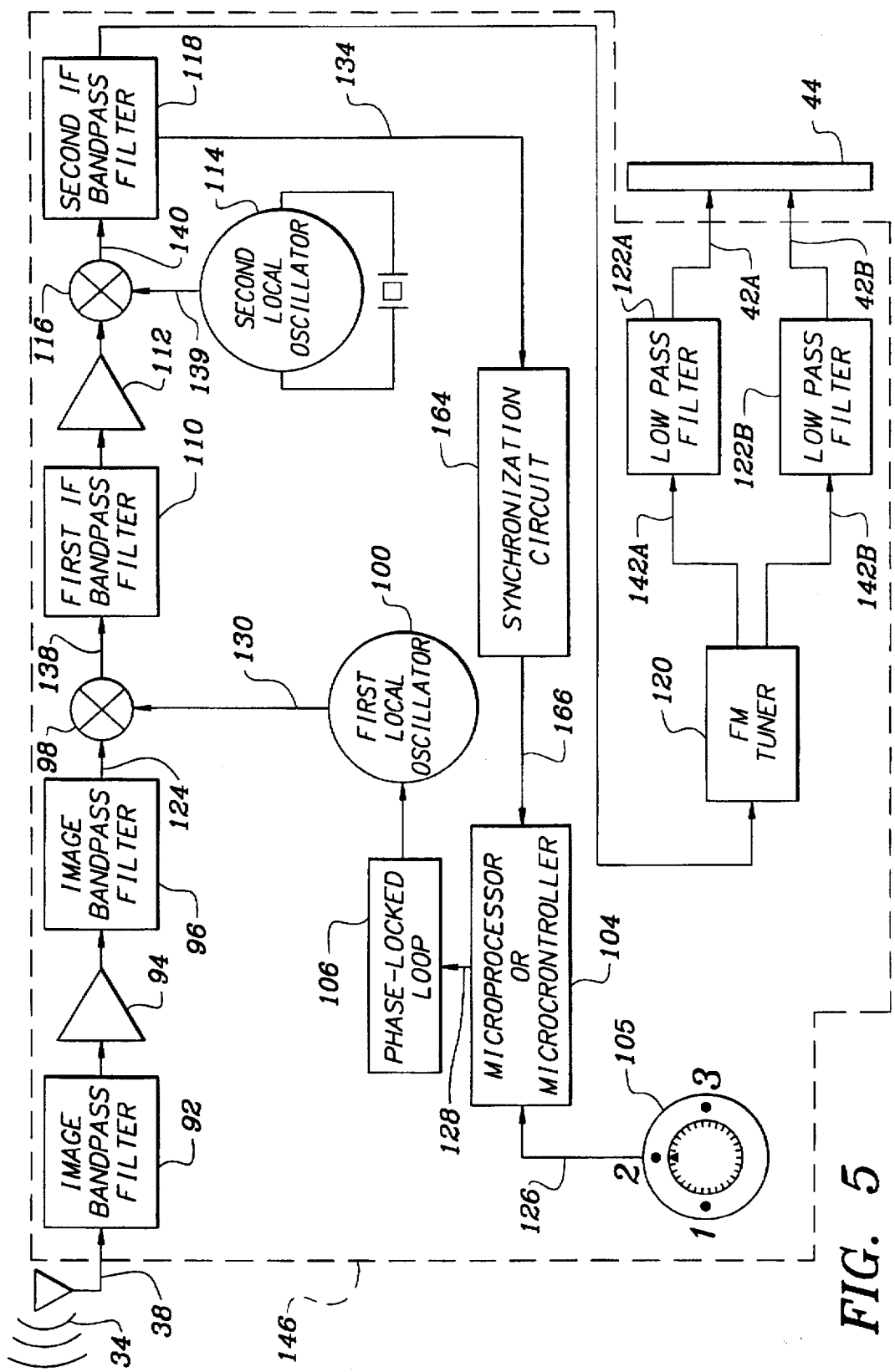
FIG. 5 is a block diagram of the receiver of the analog spread spectrum wireless speaker system using frequency hopping.

FIGS. 4 and 5 show an analog frequency hopping (FH) spread spectrum transmitter/receiver system. In particular, FIG. 4 shows the FH transmitter circuitry 144 while FIG. 5 shows the FH receiver circuitry 146. Operation of the DS transmitter circuitry 32 in FIG. 2 and operation of the FH transmitter circuitry 144 in FIG. 4 are similar except for the modulation stage, as will be discussed below. Operation of the DS receiver circuitry 40 in FIG. 3 and operation of the FH receiver circuitry 146 in FIG. 5 are similar except for the generation of the first local oscillator 100 signal on lead 130, as will also be discussed below.

The FH transmitter circuitry 144 (FIG. 4) replaces the spread spectrum signal processor 64 in the DS transmitter circuitry 32 (FIG. 2) with a second phase locked loop (PLL) 148 and a second voltage controlled oscillator (VCO) 150 for generating a signal on lead 152 that constantly changes in accordance to a hopping sequence. The hopping sequence comprises a PN code that is stored in the transmitter microprocessor 54. The microprocessor 54 systematically loads the PLL 148 (e.g., Motorola MC12210) via data line 154 according to the hopping sequence to change the frequency of the second VCO 150 (e.g., any commercially-available VCO). The FM output of the VCO 60 (comprising the multiplexed stereo signal) on lead 84 is then mixed with the signal on lead 152 in a mixer 156 (any commercially-available mixer). The resulting signal on lead 158 is a modulated frequency hopping carrier signal in the range of 2.4–2.4835 GHz. This modulated frequency hopping carrier signal is then fed to a bandpass filter 160 that eliminates unwanted signals resulting from the mixing process in mixer 156. This filtered signal on lead 162 is then fed to the power amplifier 70, as discussed previously.

The FH receiver circuitry 146 (FIG. 5) eliminates the BPSK demodulator 102 and replaces the spread spectrum signal processor 108 in the DS receiver circuitry 40 (FIG. 3) with a synchronization circuit 164. Therefore, the output of the first local oscillator 100 on lead 130 directly feeds the first down-converter mixer 98. Generation of the first local oscillator 100 signal on lead 130 in the FH receiver circuitry 146 is as follows: The house code select switch 105 setting determines the reference frequency in the 2.4 GHz band, as was discussed earlier with respect to the DS receiver circuitry 40. Furthermore, in the FH receiver circuitry 146, the receiver microprocessor 104 also contains the PN code that is found in the transmitter microprocessor 54. The receiver microprocessor 104 also must switch this first local oscillator 100 reference frequency in accordance with the transmitter frequency hopping sequence. Once the FH receiver circuitry 146 and the FH transmitter circuitry 144 are synchronized, the filtered signal on lead 124 (the multiplexed stereo signal) can be down-converted and demodulated, as discussed previously with respect to the DS receiver circuitry 40. The synchronization is achieved by the synchronization circuit 164 monitoring the output from the second IF bandpass filter 118 on lead 134, as discussed earlier with respect to the DS receiver circuitry 40. When the FH receiver circuitry 146 and the FH transmitter circuitry 144 both are at the correct frequency, the synchronization circuit 164 provides a control signal on lead 166 to the microprocessor 104 that keeps the timing of the FH receiver circuitry 146 hopping sequence the same as the FH transmitter. If the FH transmitter circuitry 144 frequency and the FH receiver circuitry 146 frequency are different, the synchronization circuit 164 generates an error signal on lead 166, thereby informing the FH receiver microprocessor 104 to change the frequency hopping sequence of the first local oscillator 100. Thus, once the FH receiver circuitry 146 is locked, the frequency hopping sequence does not change and when the FH receiver circuitry 146 is not locked, the frequency hopping sequence dynamically changes until lock is achieved.

Without further elaboration, the foregoing will so fully illustrate the invention that others may, by applying current or future knowledge, adopt the same for use under various conditions or service.

We claim:

1. A high fidelity, wireless transmission, audio system for use with an audio source, the source providing a first electrical input signal and a second electrical input signal, said audio system arranged for wirelessly transmitting over the air an electrical signal representing said audio input signals, said audio system comprising:

a transmitter arranged to be coupled to an audio source and comprising:
multiplexing means for converting said first and second electrical input signals into a first composite electrical signal;
carrier signal producing means for producing a carrier signal of a predetermined frequency of at least 2.4 GHz;
spread spectrum modulation means for modulating said carrier signal with said first composite electrical signal to produce a modulated carrier signal;
first antenna means for emitting over the air said modulated carrier signal at a power level not exceeding approximately 1 watt; and a receiver located within a range of approximately 10 to 300 feet (3 to 90 meters) of said transmitter and being coupled to an audio transducing device, said receiver receiving and demodulating said modulated carrier signal into a second composite signal, said receiver comprising:
second antenna means for receiving said modulated carrier signal radiated from said first antenna;
first local oscillator means for generating a first local oscillator signal to be mixed with said modulated carrier signal;
spread spectrum demodulation means for demodulating said modulated carrier signal by mixing said first local oscillator signal with said modulated carrier signal to produce said second composite signal;
demultiplexing means for converting said second composite signal into a first electrical output signal and a second electrical output signal;
said spread spectrum demodulation means further comprising a first mixer for mixing said first local oscillator signal with said modulated carrier signal to generate said first intermediate frequency signal; said spread spectrum demodulation means further comprising:
a second local oscillator of a constant frequency which produces a second local oscillator signal; and
a second mixer for mixing said second local oscillator signal with said first intermediate frequency signal to generate a second intermediate frequency signal.

\* \* \* \* \*